United States Patent [19]

Stevenson

[11] Patent Number: 4,936,675
[45] Date of Patent: Jun. 26, 1990

[54] CALIBRATED BENDER FOR FIBER OPTIC CABLE POSITION DETERMINATION

[75] Inventor: Willard Stevenson, San Diego, Calif.

[73] Assignee: The United States of America as represented by the Secretary of the Navy, Washington, D.C.

[21] Appl. No.: 353,714

[22] Filed: May 14, 1989

[51] Int. Cl.⁵ .................. G01N 21/84; G01N 21/88
[52] U.S. Cl. ............................................. 356/73.1
[58] Field of Search ........................................ 356/73.1

[56] References Cited

U.S. PATENT DOCUMENTS

| | | | |
|---|---|---|---|
| 4,525,818 | 6/1985 | Cielo et al. | 367/149 |
| 4,530,078 | 7/1985 | Lagakos et al. | 367/149 |
| 4,603,972 | 8/1986 | Adams | 356/4 |
| 4,659,215 | 4/1987 | Sumida et al. | 356/73.1 |
| 4,705,347 | 11/1987 | Shen et al. | 350/96.15 |
| 4,725,124 | 2/1988 | Taylor | 350/96.29 |

Primary Examiner—Vincent P. McGraw
Attorney, Agent, or Firm—Harvey Fendelman; Thomas Glenn Keough

[57] ABSTRACT

Two sets of cylindrical fingers disposed in an interdigital relationship are pivoted together, scissors fashion, to receive a portion of an optical fiber cable. When the fingers are rotated to a closed position, they create a predetermined series of bends in the portion of the optical fiber cable that can be observed by an optical time domain reflectometer. This observation allows a remote monitor to determine the relative location of the bends with respect to a suspected break or other anomaly in the optical fiber cable so that a maintenance or repair crew can go directly to the location of the anomaly for quick action.

9 Claims, 2 Drawing Sheets

CALIBRATED BENDER FOR FIBER OPTIC CABLE POSITION DETERMINATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Until long haul fiber optic systems were developed there was not much call for loss localization over great distances. Even when the land based telecommunications community used long lengths of optical fibers it was much easier to localize faults than with undersea systems. For example, there was the practical problem of where a suspected fault is located when the fault location is being made relative to the world that we are all familiar with. For example, if a maintenance crew is told that an optical fiber is broken 13.123 kilometers down the line this information is of little use as they search exactly where the break is made. Familiar landmarks, odometer readings and lastly a tape measure provide some help however these can be impractical in a good many applications such as hilly or mountainous terrain.

Optical data transmission cables include optical fibers that typically are fabricated by drawing down a glass rod that contains a core region and cladding region. The resulting drawn fiber provides a transmission path for light energy. When such a fiber is bent some of the energy passes through the cladding and is absorbed by the fiber's coating. This creates a localized loss of light and is indicated by a reduction of the transmitted power. Different fibers and cable constructions have been noted as providing various magnitudes of loss for a given bend.

The optical time-domain reflectometer (OTDR) is a well known device for determining the transmission characteristics of a particular fiber. The losses attributed to bends can be localized and measured. It is not uncommon for off-the-shelf OTDRs to measure distances greater than 100 kilometers and resolve power to 0.01 db. As a consequence, it is well known that OTDRs have the capability of pin-pointing losses attributed to bends throughout the length of an optical fiber being measured.

When trying to determine where a particular location along a fiber cable is, a technician or optical fiber serviceman would simply kink or bend the fiber cable by hand and a distant observer would monitor where the kink or bend is located by an interconnected OTDR. Then the technician or workman could go one way or the other along the fiber cable to the point where a particular equipment or maintenance or servicing has been indicated as needing attention.

This is essentially the same routine relied upon when divers go along the length of an undersea fiber and try to help locate a fault or point where instrumentation is to be maintained or attached. When the diver's location is determined by noting where a bend is made in the fiber, appropriate instructions can be transmitted so that the diver can go to the desired place. One drawback of this approach is that, despite the ruggedness and the adaptability of optical fibers for a wide variety of data gathering tasks, the fibers can be damaged when bent or crimped too hard. An inadvertent extreme bending, in the case of a particular fiber, may cause cracks or otherwise damage the fiber to impair its data transmission capabilities. This undesirable consequence should be avoided whenever and wherever possible. An alternative to this way of determining a precise location along an undersea cable would be to measure the distance physically. Under water this would require substantial diver time or a very good underwater vehicle. A satellite location device may also provide general location and acoustic navigational aids may also be relied upon. However, none have the accuracy for precisely determining location along a cable's length.

Thus, a continuing need exists in the state of the art for a calibrated bender for an optical fiber which provides for the location of a series of predetermined bends that do not damage the fiber yet assures the precise location of the bends by a remote OTDR.

SUMMARY OF THE INVENTION

The present invention is directed to providing a method and means for creating a series of predetermined bends in an optical fiber cable which are capable of being located by an OTDR and yet which do not damage the optical fiber. Two cylindrical finger members are pivoted together, scissors fashion, to shape an optical fiber into a series of non-damaging serpentine bends. Suitable aligned grooves of the cylindrical fingers rotated into an open position receive the fiber and the fiber is placed to lie in one aligned set of the grooves. Rotation of the cylindrical fingers in the opposite direction creates several serpentine bends in the fiber. Securing means such as a set screw and Velcro straps and the like hold the cable in a clamped condition so that the series of predetermined bends are maintained for remote observation.

An object of the invention is to provide a method and means for imparting predetermined bends in an optical fiber without damaging the fiber.

Another object is to provide a predetermined series of bends in an optical fiber to enable the location of the bends by a remote OTDR.

Still another object of the invention is to provide a device for imparting a series of bends which can be set and released to free the operator's hands.

Still another object of the invention is to provide a bend inducing device having a variable setting for modifying a series of bends to assure their location along the length of the fiber.

These and other objects of the invention will become more readily apparent from the ensuing specification when taken in conjunction with the appended drawings and claims.

DESCRIPTION OF THE PREFERRED EMBODIMENT

Figure 1:
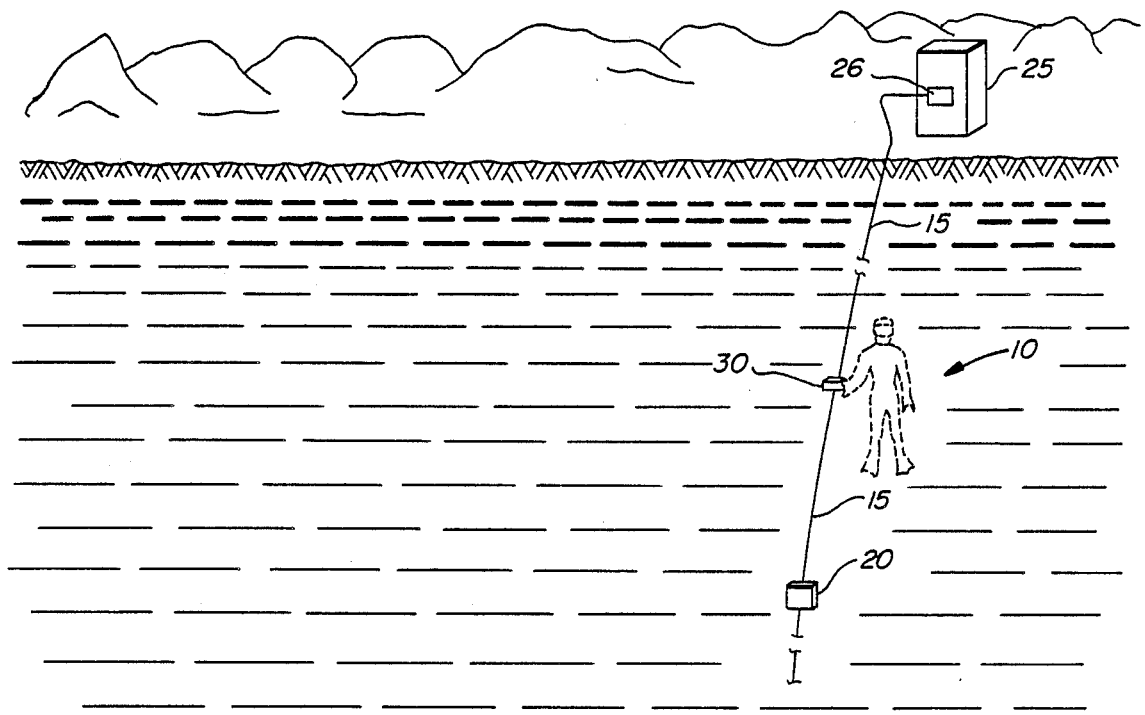
FIG. 1 shows a diver using the bender device in an operational application.

Referring now to FIG. 1 of the drawing a diver 10 is engaged in a routine attendance of an undersea instrumentation package 20 that is optically coupled to an undersea optical fiber cable 15. The instrumentation may be any one of a variety of monitors of some ambient phenomena which requires, for example, routine inspection and maintenance or replacement of batteries so that its data gathering task can proceed uninterrupted.

The optical fiber cable extends a considerable distance underwater and may link a number of such data gathering sensors to a remote monitoring station 25 located several kilometers distant. The station could be shore-based or on a floating buoy might be provided with an appropriate transponder for relaying information via a radio link to a more remotely located central station. In addition to other optical data processing equipments, an optical time-domain reflectometer (OTDR) 26 usually is located at such station to give the operators some indications of the cable condition. Appropriate repairs can be made by divers or undersea vehicles when the OTDR and associated equipments indicate certain signals representative of anomalies such as bends, cracks or breaks are present in the optical fibers of the optical fiber cable or indicate that some of the data gathering monitors are not working properly.

A reoccurring problem with maintaining undersea optical fiber cables is that a diver 10 oftentimes cannot determine his present location with respect to where he would like to be along the length of optical fiber cable 15. Where he would like to be may be where a monitor 20 is or where there is a break or crimp in the cable.

A cable bending tool 30 imparts a series of predetermined non-damaging serpentine bends where it is applied on optical fiber cable 15. OTDR 26 can determine where the bends are and an underwater communications link can transmit this information to the diver.

Figure 2A:
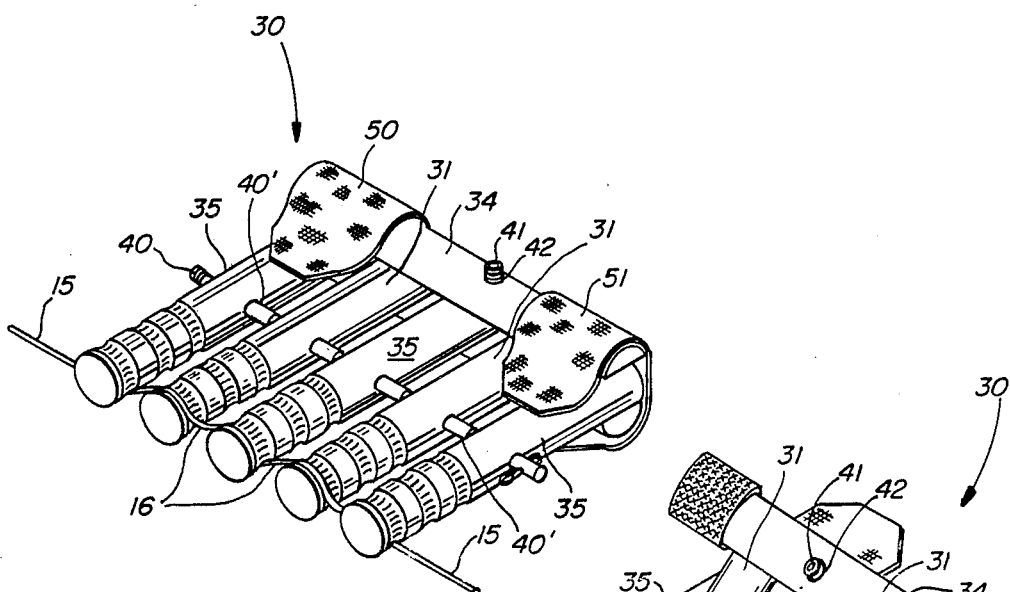
FIG. 2A depicts an isometric view of the invention in the closed position with the fiber in place.
Figure 2B:
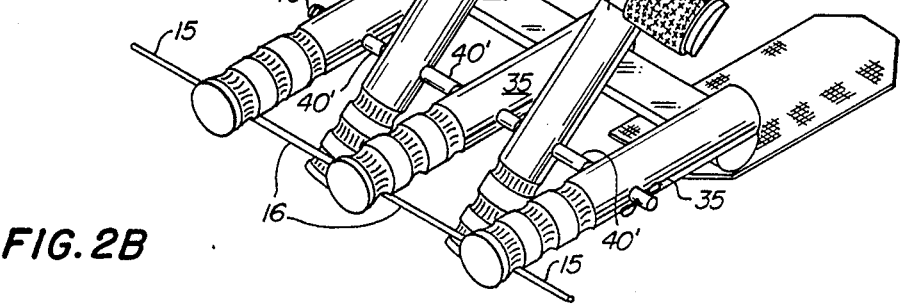
FIG. 2B shows an isometric view of the invention in the open position with the fiber in place.

Referring to FIGS. 2A and 2B, calibrated bender 30 has been developed to bend a relatively small diametered optical fiber cable 15 into a series of predetermined serpentine bends 16 that are not too extreme so as to damage the cable. The calibrated bender is applied to a cable somewhere distant from the monitoring station 25 where an operator watches the screen of OTDR 26. The cable is looped through the legs of a U-shaped member 31 and a W-shaped member 35 when they are rotated to an open position as depicted in FIG. 2B. A portion of the fiber optic cable is laid across the calibrated bender and the diver or other operator rotates the members so that the optical fiber cable is bent into a serpentine configuration as it is bent by legs 36, 32, 37, 33 and 38, see FIGS. 3, 4 and 5.

Optical signals encountering these bends are capable of being monitored by OTDR 36 and an underwater communication system can relay the location information to the diver to enable proper action.

When the calibrated bender is removed from the optical fiber cable, the cable returns to its undisturbed condition by its own elastic force. If, however, there is a slight deformation in the cable, it usually can be manually straightened until optical losses attributed to the bends are no longer detectable.

Figure 3:
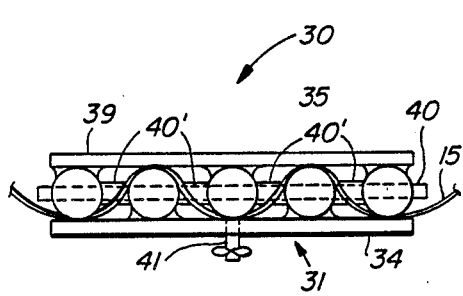
FIG. 3 is a front view of the invention.
Figure 4:
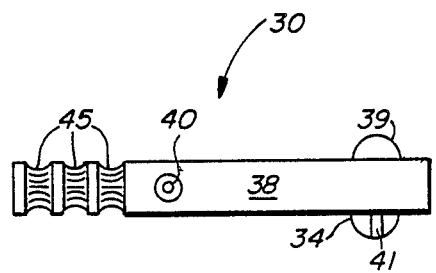
FIG. 4 is a side view of the invention
Figure 5:
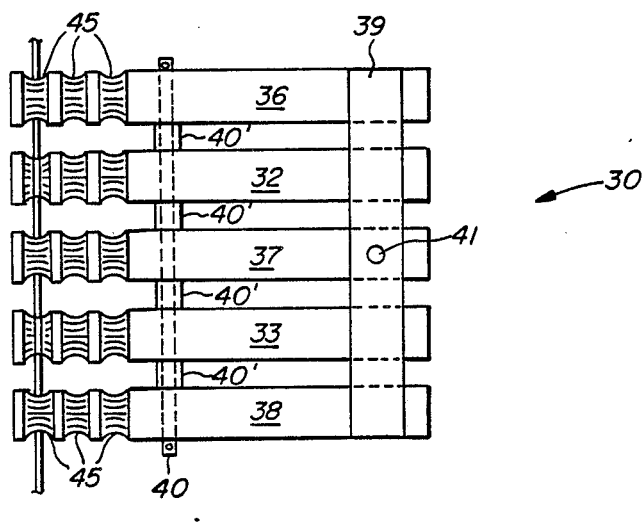
FIG. 5 is a top view of the invention.

Referring now to FIGS. 3, 4 and 5, calibrated bender 30 includes an essentially u-shaped member 31 and an essentially w-shaped member 35 that are pivoted together, scissors-like, on a shaft 40. The members are adjusted to assume a predetermined scissor-like orientation with respect to each other by a set screw 41 and are secured in this orientation by suitable holding means 50 and 51.

U-shaped member 31 includes a pair of cylindrical fingers 32 and 33 that are spaced apart a predetermined amount and welded onto a cross member 34 in such a fashion to extend parallel one from the other. W-shaped member 35 has three cylindrical fingers 36, 37 and 38 similarly welded onto their own cross member 39 so that they too extend in a spaced apart parallel relationship one from the other. The spacing of the cylindrical fingers of the U-shaped member and the cylindrical fingers of the W-shaped member is such that they are substantially equidistantly spaced one from the other in an interdigital relationship when they are journaled on shaft 40 with a spacer collar 40' provided between adjacent cylindrical fingers. Set screw 41 mechanically engages an appropriately threaded bore 42 in cross member 34 to extend its shank portion against cross member 39. Consequently, appropriate rotation of set screw 41 rotates W-shaped member 35 relative to U-shaped member 31. The effect of this rotation is to open or close, depending on the direction of rotation of the set screw, the U-shaped and W-shaped members, scissors fashion, so that the degree of bending of fiber 15 can be selectively set or changed to a different setting.

Several aligned grooves 45 are provided at opposite ends of the cylindrical fingers to accommodate differently sized fiber optic cables or to impart different series of serpentine bends Each aligned grooves have its own characteristics to create a series of bends that are safe and suitable for one optical fiber cable design. Once a particular series of bends is established for appropriate location by the remote monitor a diver or operator merely has to place the fiber cable in its predetermined set of grooves with the predetermined displacement of set screw 41 to reproduce an appropriate series of bends. The cable bender should be calibrated for each cable type used to avoid the possibility of damage and to create a series of detectable bends. The parameters of importance are loss magnitude and plastic deformation of the cable. A sample cable several hundred meters is required as well as an appropriate OTDR. Set screw 41 should be fully in so that the U-shaped and W-shaped members are displaced the maximum amount and the portion of the optic fiber cable between the members is bent the least. Loss readings before, during and after the bends should be recorded. The set screw should be backed out one turn at a time and similar data taken. The appropriate setting is the setting which gives the least discernable loss and allows the cable to return to a normal undeformed state.

The calibrated bender is small enough to be operated by hand by a diver or a manipulator on an undersea vehicle. The calibrator has an inherent design flexibility to accommodate several cable designs such as steel armored or kevlar or fiber reinforced plastic.

For example, one-half inch diameter rods were selected for fabrication of cylindrical fingers 32, 33, 36, 37 and 38 to ensure adequate attenuation of light based on prior experience with a 2.4 mm cable. For this cable size an upper limit would be about 1.25 inches in diameter above which no light is lost. Some fiber cable designs may not react as significantly under the one-half inch bend so that rods would need to be smaller. In either case, the minimum allowable radius of curvature of the cable must be considered to avoid damage. Set screw 41 allowed a variable amount of coverage or some fractional wrap about the cylindrical fingers that range from zero to a 368° coverage. Spacers 40' were dimensioned to create a ¼ inch spacing between the ½ inch rods by evaluating the total angular contact around the five rods based on a 0.10 inch diameter cable. A total coverage about the mandrels defined by the cylindrical fingers was found to be about 92° each on the three central cylindrical fingers 32, 33 and 37 and 46° each on the two cylindrical fingers 36 and 38. This gave a 368° wrap over curved surfaces which was found to be sufficient to impart a detectable bend in optical fiber cable 15.

The number of cylindrical fingers for demonstration of the inventive concept was chosen at 5. This number provides an uncomplicated and compact design and gives an acceptable, measurable loss which is based on the total optical fiber covering where it is wrapped about the cylindrical fingers. More fingers with a larger spacing between adjacent fingers could have been selected or the fingers need not have been parallel nor aligned one with one other to achieve a measurable bend loss for location determination. The parallel and equidistant spacing described above were found to give a uniform series of serpentine bends that reduced the possibility of inadvertently damaging a cable.

Grooves 45 in the cylindrical fingers not only prevented the optical fiber cable from sliding out but also established a number of distinct amounts of angular contact an optical fiber bends for a given positioning of set screw 41.

Set screw 41 has been disclosed as being fitted into accommodating threads in cross member 34 for bearing against an inner surface of cross member 39. A journaled retained fitting in cross member 39 could have been provided to assure selective bidirectional positioning and holding of cross member 39 relative to cross member 34. This would reduce the need for an further structure. Optionally, suitable fastening means 50 and 51, such as straps, ties, Velcro strips etc. could be wrapped about or bonded onto or otherwise suitably affixed to cross members 34 and 39 to secure the U-shaped member and the W-shaped member in a predetermined angular displacement after an appropriate adjustment of the set screw has been made.

Obviously, many modifications and variations of the present invention are possible in light of the above teachings. It is therefore to be understood that within the scope of the appended claims the invention may be practiced otherwise than as specifically described.

I claim,
1. An apparatus for creating a controlled anomaly along an optical fiber cable comprising:
   means for defining at least one rounded surface configured to receive a portion of said optical fiber cable thereacross;
   means disposed in a juxtaposed interdigital relationship with the defining means for providing a plurality of rounded surfaces configured to receive a portion of said optical fiber cable thereacross;
   means extending through said defining means and the providing means for pivotally permitting a scissors-like rotational displacement of said defining means with respect to said providing means; and
   means operatively coupled to said defining means and said providing means for controllably imparting said scissors-like rotational displacement of said defining means and said providing means to shape said portion of said optical fiber in at least one bend and thereby create said controlled anomaly.

2. An apparatus according to claim 1 in which said defining means has at least one rounded finger, said providing means has at least two rounded fingers and said pivotally permitting means is a pin extending through the rounded fingers to permit said scissors-like rotational displacement.

3. An apparatus according to claim 2 further including:
   means disposed between said rounded fingers of said defining means and said providing means that are adjacent one another for maintaining a predetermined spaced separation therebetween to assure that each bend in said optical fiber cable is not bent beyond a predetermined limit.

4. An apparatus according to claim 3 further including:
   means for securing said defining means and said providing means at a desired position of said scissors-like rotational displacement to assure said controlled anomaly when said optical fiber cable has the portions thereof shaped into a serpentine configuration by said securing means and said defining means.

5. An apparatus according to claim 4 in which said defining means is an essentially U-shaped member with two cylindrical fingers shaped with aligned grooves for receiving said optical fiber cable thereacross and said providing means is an essentially W-shaped member with three cylindrical fingers shaped with aligned grooves for receiving said optical fiber cable thereacross.

6. An apparatus according to claim 4 or 5 in which said predetermined separation maintaining means is a set screw threadably engaged in said defining means and abutting said providing means to assure said predetermined rotational displacement.

7. An apparatus according to claims 4 of 5 in which said securing means is mounted on said set screw and is configured to rotatably engage said providing means to assure said predetermined rotational displacement.

8. An apparatus according to claims 4 or 5 in which the securing means is at least on strip of a fastener material having portions that mutually engage.

9. A method of creating a controlled anomaly at a desired location in a fiber optic cable capable of being detected by an OTDR for comprising:
   placing the fiber optic cable so that a portion thereof at said desired location lies between the rounded fingers of a pair of pivotally joined members;
   rotating the pivotally joined members a predetermined amount to impart a series of serpentine controlled bends in said portion of said optical fiber cable;
   securing the pivotally joined members when said predetermined amount is reached; and
   monitoring the indication of the controlled anomaly to assure an indication of said desired location.

* * * * *